United States Patent
Balaramn et al.

(10) Patent No.: US 11,212,681 B1
(45) Date of Patent: Dec. 28, 2021

(54) INTRUSION DETECTION IN A WIRELESS NETWORK USING LOCATION INFORMATION OF WIRELESS DEVICES

(71) Applicant: Fortinet, Inc., Sunnyvale, CA (US)

(72) Inventors: Sridhar Balaramn, Bangalore (IN); Pramod Shanbhag, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/914,602

(22) Filed: Jun. 29, 2020

(51) Int. Cl.
*H04W 12/122* (2021.01)
*H04L 29/06* (2006.01)
*H04W 4/029* (2018.01)

(52) U.S. Cl.
CPC ....... *H04W 12/122* (2021.01); *H04L 63/1466* (2013.01); *H04W 4/029* (2018.02)

(58) Field of Classification Search
CPC ... H04W 12/122; H04W 64/00; H04W 12/12; H04W 84/12; H04W 12/08; H04W 4/029; H04W 4/025
See application file for complete search history.

(56) References Cited

U.S. PATENT DOCUMENTS

| | | | | |
|---|---|---|---|---|
| 7,184,777 B2* | 2/2007 | Diener | ............. | H04W 24/00 |
| | | | | 455/456.1 |
| 7,574,202 B1* | 8/2009 | Tsao | ............. | H04L 63/0272 |
| | | | | 455/411 |
| 7,856,209 B1* | 12/2010 | Rawat | ............. | H04W 64/00 |
| | | | | 455/67.11 |
| 9,491,162 B2* | 11/2016 | Griffioen | ............. | H04L 29/06 |
| 10,462,672 B1* | 10/2019 | Sundaram | ............. | H04W 12/122 |
| 2004/0198392 A1* | 10/2004 | Harvey | ............. | H04L 63/20 |
| | | | | 455/456.1 |
| 2006/0068811 A1* | 3/2006 | Adya | ............. | H04W 12/122 |
| | | | | 455/456.2 |
| 2014/0052508 A1* | 2/2014 | Pandey | ............. | G06Q 30/02 |
| | | | | 705/14.4 |

(Continued)

OTHER PUBLICATIONS

"Cisco Adaptive wIPS Deployment Guide", CISCO, Mar. 16, 2017, https:www.cisco.com/c/en/us/td/docs/wireless/technology/wips/deployment/guide/WiPS_deployment_guide_html#pgfId-43454, 63 pages.

(Continued)

*Primary Examiner* — Dung Hong
(74) *Attorney, Agent, or Firm* — HDC Intellectual Property Law, LLP

(57) ABSTRACT

Systems and methods for detecting and/or preventing intrusions in a wireless network based on location information of wireless devices are provided. According to one embodiment, a database is maintained by a wireless network security system that includes historical location information and a media access control (MAC) address for multiple wireless devices observed by wireless access points (APs) of a wireless network of an enterprise. Information regarding one or more probe signals originated by a wireless device of the multiple wireless devices is received by the wireless network security system from the multiple APs. A location of the wireless device is determined by the wireless network security system based on the information. A potential attack being conducted by the wireless device or in which the wireless device is involved is identified based on one or more of behavior exhibited by the wireless device, the location and the database.

20 Claims, 12 Drawing Sheets

(56) References Cited

U.S. PATENT DOCUMENTS

| | | | | |
|---|---|---|---|---|
| 2015/0208242 A1* | 7/2015 | Ji | ........................ | H04W 12/08 |
| | | | | 726/4 |
| 2015/0304984 A1* | 10/2015 | Khemani | .............. | H04W 48/10 |
| | | | | 455/456.1 |
| 2016/0127931 A1* | 5/2016 | Baxley | .................. | G06F 16/951 |
| | | | | 455/67.16 |

OTHER PUBLICATIONS

"FortiWLC (SD) Configuration Guide", Fortinet Inc., 2019, 574 pages.
"FortiWLM Wireless Manager", Fortinet, Inc., 2019, 7 pages.
Wireless IDS, Fortinet, Inc., 2020, https://help.fortinet.com/fos50hlp/54/Content/FortiOS.fortigate-wireless-54/wids.htm., 2 pages.

* cited by examiner

INTRUSION DETECTION IN A WIRELESS NETWORK USING LOCATION INFORMATION OF WIRELESS DEVICES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to intrusion detection and prevention systems for wireless networks. In particular, embodiments of the present invention relate to intrusion detection and/or prevention in a wireless network using real-time and/or historical location information of wireless devices.

Description of the Related Art

Intrusion Detection Systems (IDS) and Intrusion Prevention Systems (IPS) have been traditionally deployed in wired networks. These systems have evolved over the years to detect and prevent various types of intrusions by scanning traffic (in-line or copy traffic) associated with the protected network (e.g., an enterprise network). Responsive to detection of an intrusion, mitigation is typically achieved by an IPS using port blocking or rule/policy updates to deny access to the network.

Intrusion detection and prevention technologies face additional challenges in a wireless network due to the different ways in which wireless devices connect to the wireless networks and the mobile nature of wireless devices.

SUMMARY

Systems and methods are described for detecting and/or preventing intrusions in a wireless network based on location information of wireless devices. According to one embodiment, a database is maintained by a wireless network security system that includes historical location information and a media access control (MAC) address for multiple wireless devices observed by wireless access points (APs) of a wireless network of an enterprise. Information regarding one or more probe signals originated by a wireless device of the multiple wireless devices is received by the wireless network security system from the multiple APs. A location of the wireless device is determined by the wireless network security system based on the information. A potential attack being conducted by the wireless device or in which the wireless device is involved is identified based on one or more of behavior exhibited by the wireless device, the location and the database.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
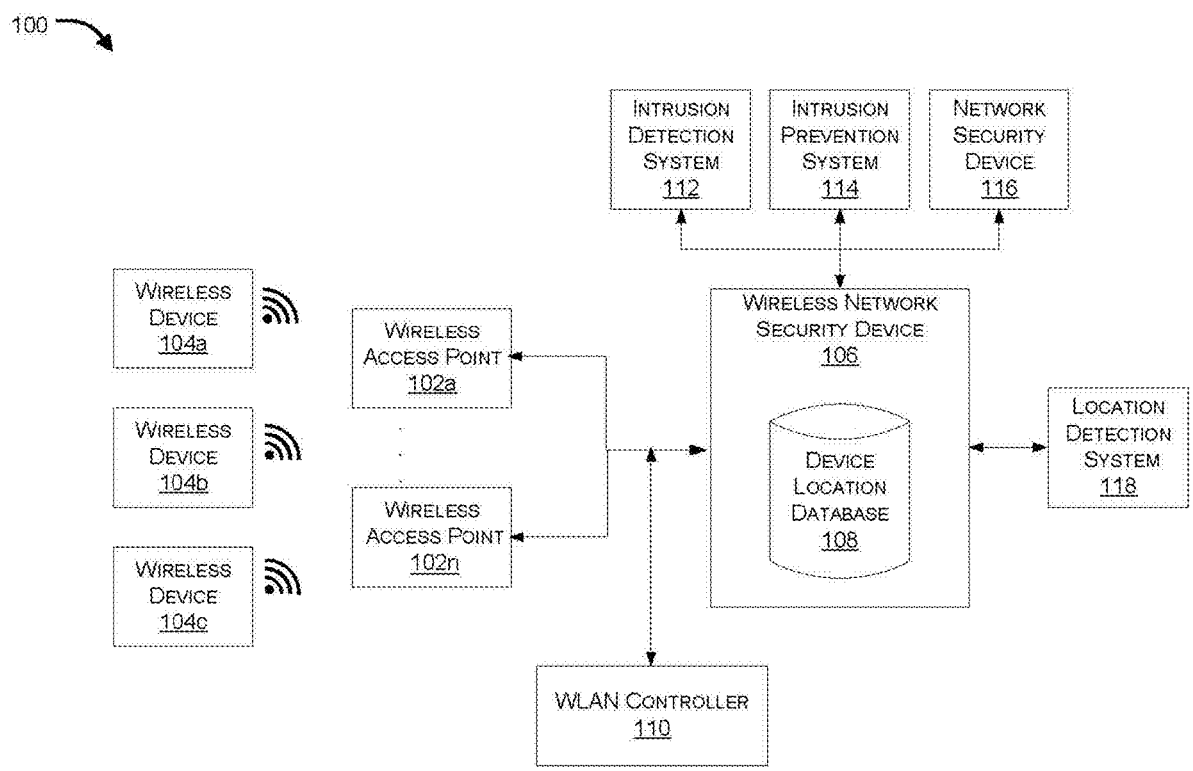
FIG. 1 conceptually illustrates a simplified wireless network of an enterprise network in which various types of attacks are detected in accordance with an embodiment of the present disclosure.

Systems and methods are described for detecting and preventing intrusion in a wireless network using location information of the wireless device. According to one embodiment, a wireless network security device is configured to receive an access request from a wireless device and detect a location of the wireless device to determine if the wireless device is a rogue wireless device. The wireless network security device may make use of a database having stored therein a list of physical addresses (e.g., Media Access Control (MAC) addresses) and corresponding deployed locations of authorized APs and authorized location boundaries within which wireless devices are permitted to operate. The authorized location boundaries may be based on the physical boundaries of a building or campus and/or may be based on historical locations and predicted locations of wireless nodes. The wireless network security device may identify a wireless device as a rogue wireless device when the determined location of the wireless device is not in the authorized location boundaries, and/or when the physical address of the wireless device does not match any of the stored physical addresses of the pre-authorized wireless nodes.

In an embodiment, the network management device can detect various types of attacks relating to wireless networks, including, but not limited to, flood attack/Media Access Control (MAC) spoof attack, de-authentication attack, evil twins etc. For example, in the context of a flood attack/MAC attack, an attacker may employ a mobile station spoofing a valid MAC address and attempt to overwhelm the wireless network by flooding the wireless network with association/authentication requests. The proposed system may detect such an attack by, for example, identifying multiple MAC addresses originating from the same physical location and can send control signals (e.g., disassociation/de-authentication requests) to cause the attack packets to be dropped by wireless access points (APs). Similarly, in an embodiment, the system may detect a de-authentication attack in which the attacker sends disassociation/de-authentication requests to cause a legitimate AP to disconnect a targeted wireless device from the wireless network, for example, to cause the targeted wireless device to instead connect to an evil twin AP. In various embodiments, the proposed system can make informed decisions to identify an attacker, for example, based on the historical movement patterns of the original MAC and that of the spoofed MAC.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

Depending upon the particular context, as used herein, a "wireless device" may refer to a mobile station (e.g., a wireless client device) or a wireless access point (AP) compatible with the Institute of Electrical and Electronics Engineers (IEEE) 802.11 wireless local area network (WLAN) standards.

As used herein a "probe signal" generally refers to a management frame associated with the IEEE 802.11 WLAN standards. Non-limiting examples of probe signals that can be sent by mobile stations to APs include probe requests, authentication (auth) frames, deauthentication (deauth) frames, and association requests. Non-limiting examples of probe signals that can be sent by APs to mobile stations include probe responses, auth frames, deauth frames, and association responses.

FIG. 1 conceptually illustrates a simplified wireless network 100 of an enterprise network in which various types of attacks are detected in accordance with an embodiment of the present disclosure. Depending upon the particular implementation, the wireless network security device 106 may be operable to detect, mitigate and/or prevent a variety of types of wireless attacks, including, but not limited to, rogue APs, peer-to-peer attacks, eavesdropping, authentication attacks, MAC spoofing, and wireless hijacking (e.g., evil twin AP).

In the context of the present example, mobile stations (e.g., wireless devices 104a-c) may be connected to wireless network 100 through one or more deployed wireless access points (e.g., wireless access points (APs) 102a-n) and/or their presence may otherwise be detected based on probe signals originated by the wireless devices 104a-c.

According to one embodiment, a wireless network security device 106 maintains information regarding wireless AP 102a-n and wireless devices 104a-c observed by one or more wireless APs 102a-n of an enterprise network within a device location database 108. As described further below, in one embodiment, the wireless network security device 106 may obtain information indicative of the locations of the wireless devices 104a-c from APs 102a-n and store historical location data associated with the wireless devices 104a-c along with their respective physical addresses (e.g., MAC addresses). The device location database 108 may store list of trusted and untrusted wireless devices and physical locations of wireless APs 102a-n.

The device location database 108 may maintain for each of multiple wireless devices (e.g., wireless devices 104a-c) observed by the wireless APs 102a-n, real-time and/or historical location information indicative of physical locations of the wireless devices 104a-c at various points in time. For each wireless device, historical location and permissible location boundaries may be stored in the device location database 108. The device location database 108 can maintain historical location information and a MAC address for each wireless device observed by APs 102a-n. In an embodiment, the device location database 108 may store defined three-dimensional (3D) or two-dimensional (2D) location boundaries indicative of a permissible area from which the wireless network can be accessed by wireless devices or a list of forbidden location zones from which access should be restricted. The 3D location boundaries may be generated by observing and predicting movement and location of the wireless devices. In an embodiment, the wireless network security device 106 makes use of the historical location information stored in the device location database 108 to determine whether an observed wireless device sending probe signals or connected to the wireless network 100 is a legitimate device or a rogue device. As the wireless signal reach is spherical in nature, intrusion can happen from outside physical boundaries or attacker can even employ drones. Having the prior knowledge of the forbidden areas within a building or physical boundaries of the site, wireless network security device 106 can detect wireless activities/attacks originating from such areas. In an embodiment, the wireless security device 106 can send control signals to APs 102a-n directly or indirectly via the WLAN controller 110 to block, drop, or reject any requests or probe signals from wireless devices determined to be located outside the physical boundaries of the site and/or within forbidden areas.

In an embodiment, the wireless network security device 106 may receive directly or indirectly from multiple of the APs 102a-n information regarding one or more probe signals originating from a wireless device of the wireless devices 104a-c and may make use of various factors, including one or more of a location determined to be associated with the wireless device, a MAC address of the wireless device, probe signal counts associated with the wireless device, and probe thresholds as well as the device location database 108 to determine whether the wireless device is a malicious mobile station. For example, a location determination system 118 associated with the wireless network security device 106 may determine a location of the wireless device. Based on the location information received, the wireless network security device 106 may identify a potential attack on the wireless network by, among other things, comparing the determined location of the wireless device with the location information maintained in the device location database 108.

In an embodiment, location detection system 118 can determine a location of a wireless device based on information regarding one or more probe signals originating from the wireless device. For example, as discussed further below with reference to FIG. 2, distance information derived from Received Signal Strength Indicator (RSSI) values extracted from one or more probe signals may be used to determine the location of a wireless device using a multilateration (e.g., trilateration) approach. Depending upon the particular implementation, various other distance-based and/or angle-based approaches (e.g., triangulation) may be used alone or in combination with multilateration.

In an embodiment, locations of observed wireless devices 104a-c are monitored and stored in the device location database 108. The device location database 108 may also have stored therein physical addresses of known authorized wireless devices and authorized location boundaries created based on historical locations and predicted locations of the authorized wireless devices. In this manner, the wireless network security device 106 can flag a wireless device as a malicious wireless device (e.g., a rogue AP or a malicious mobile station) if a probe signal or a request is initiated by the wireless device from a forbidden location zone (e.g., outside of physical boundaries of the site or premises or from within forbidden areas within the physical boundaries of the site or premises).

Appropriate mitigation measures can be triggered by the wireless network security device 106 with the assistance of other network devices (e.g., APs 102*a-n* and/or WLAN controller 110) and/or network security devices (e.g., an intrusion detection system 112, an intrusion prevention system 114 and/or other network security devices (e.g., network security device 116)). For example, the wireless network security device 106 may direct the WLAN controller 110 and one or more wireless APs 102*a-n* to take appropriate action to reject or drop requests or probe signals received by the wireless device identified as a potential malicious mobile station or a rogue AP. In an embodiment, the wireless network security device 106 can perform appropriate mitigation responsive to identification of the potential attack.

The mitigation measures may include causing (e.g., directly or indirectly via the WLAN controller 110) the APs to drop requests or probe signals received from the potential malicious mobile station or causing the APs to direct de-authentication/disassociation messages to the potential rouge AP. As part of the mitigation measures, the wireless network security system may configure the APs to perform beamforming, for example, so as to avoid interference by wireless transmission signals associated with the potential rogue AP or the potential malicious mobile station. In an embodiment, the wireless network security device can report an identity and the determined location (e.g., relative to another device in the network or an absolute location) of a malicious wireless device (e.g., a malicious mobile station or a rogue AP).

In an embodiment, when a rogue AP is identified, one or more mitigation actions may be triggered. For example, the wireless network security system 400 may cause the rogue AP to be isolated in accordance with various approaches described herein. Additionally, the wireless network security device 106 may report a unique identifier and the determined location of the wireless device to one or more other network security devices responsive to determining the wireless device represents a potential malicious wireless device.

Figure 2:
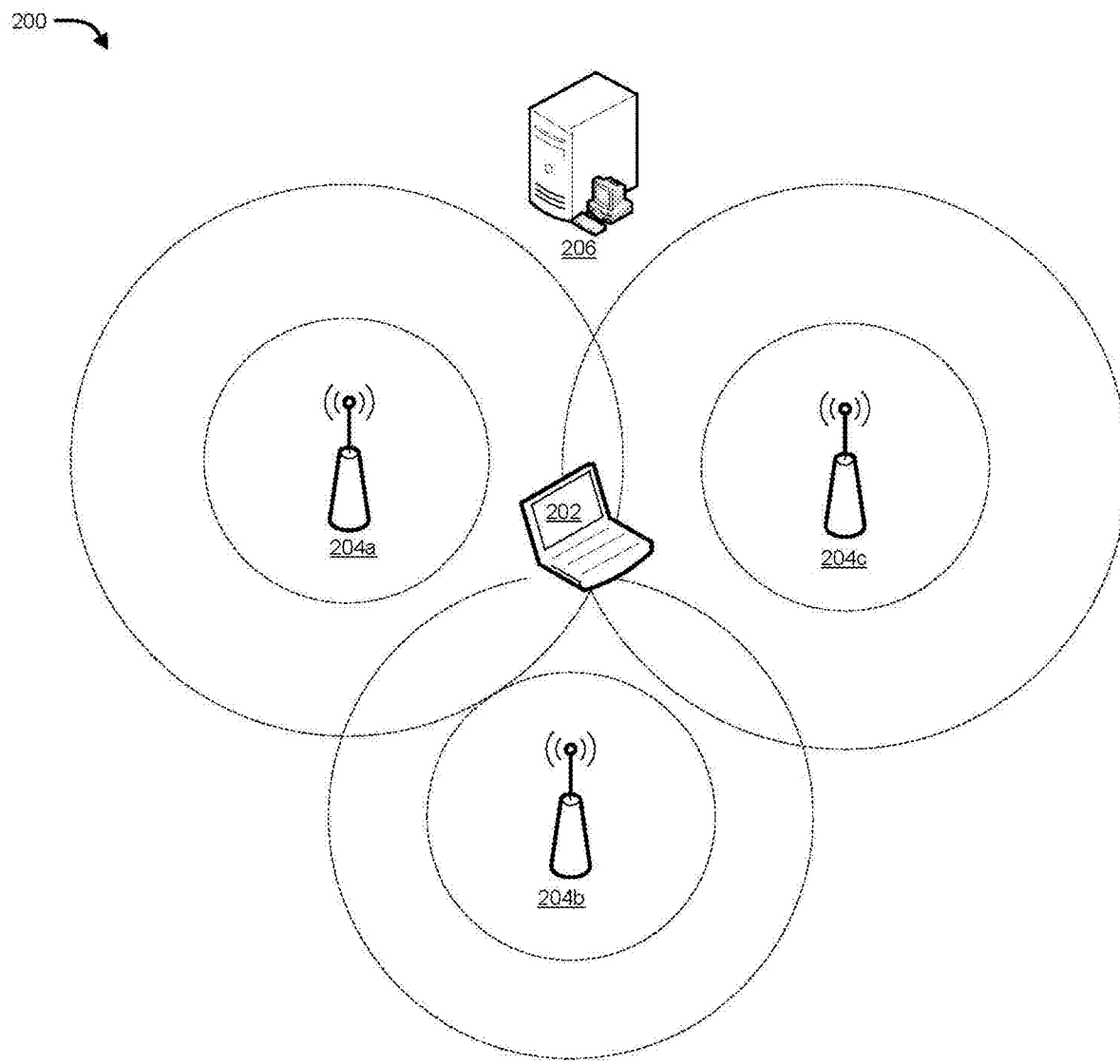
FIG. 2 illustrates an example trilateration technique for determining a location of a wireless device in accordance with an embodiment of the present disclosure.

FIG. 2 illustrates an example trilateration technique 200 for determining a location of a wireless device in accordance with an embodiment of the present disclosure. As those skilled in the art appreciate, mobile stations (e.g., wireless device 202) periodically emit a type of probe signal (e.g., a probe request) to discover 802.11 networks within proximity. These probe requests may be used by mobile stations to advertise their capabilities. In one embodiment, APs 204*a-c* capture the MAC address and signal strength information (RSSI) from these probes and provide the information (directly or indirectly via a WLAN controller (e.g., WLAN controller 110)) to a location detection system (e.g., location detection system 206) associated with a wireless network security device (e.g., wireless network security device 106). The location detection system 206 may compute the location of the wireless device 202 based on the RSSI values.

In an embodiment, the trilateration technique 200 can be used to determine the location of a wireless device in a wireless network (e.g., wireless network 100). For example, to determine location of wireless device 202, RSSI values associated with probe signals sent by the wireless device 202 and observed by APs 204*a-c* can be collected by location determination server 206 and used to calculate corresponding distance measurements indicative of the distance of the wireless device 202 from the respective APs 204*a-c* as an input to a trilateration algorithm. In an embodiment, additional information associated with or derived from the probe signals may be used in connection with calculating the location of the wireless device 202, including, but not limited to, the time of arrival, time difference of arrival and angle of arrival can used. In one embodiment, direction information from beamforming antennas of the APs 204*a-c* may also be used to determine coordinates of the wireless device 202 in 3D space. As one may appreciate, although RSSI value based location determination and smart beamforming antenna directional information based location determination techniques are described herein, other techniques for detecting a location of the wireless devices can also be used.

Using observed behavior associated with the wireless device, the determined location of the wireless device, and referring to the device location database, the wireless network security device may determine existence of a potential attack and flag the wireless device as an attacking wireless device (e.g., a rogue AP or a malicious mobile station) as described further below, for example, with reference to FIGS. 3A-B.

Figure 3A:
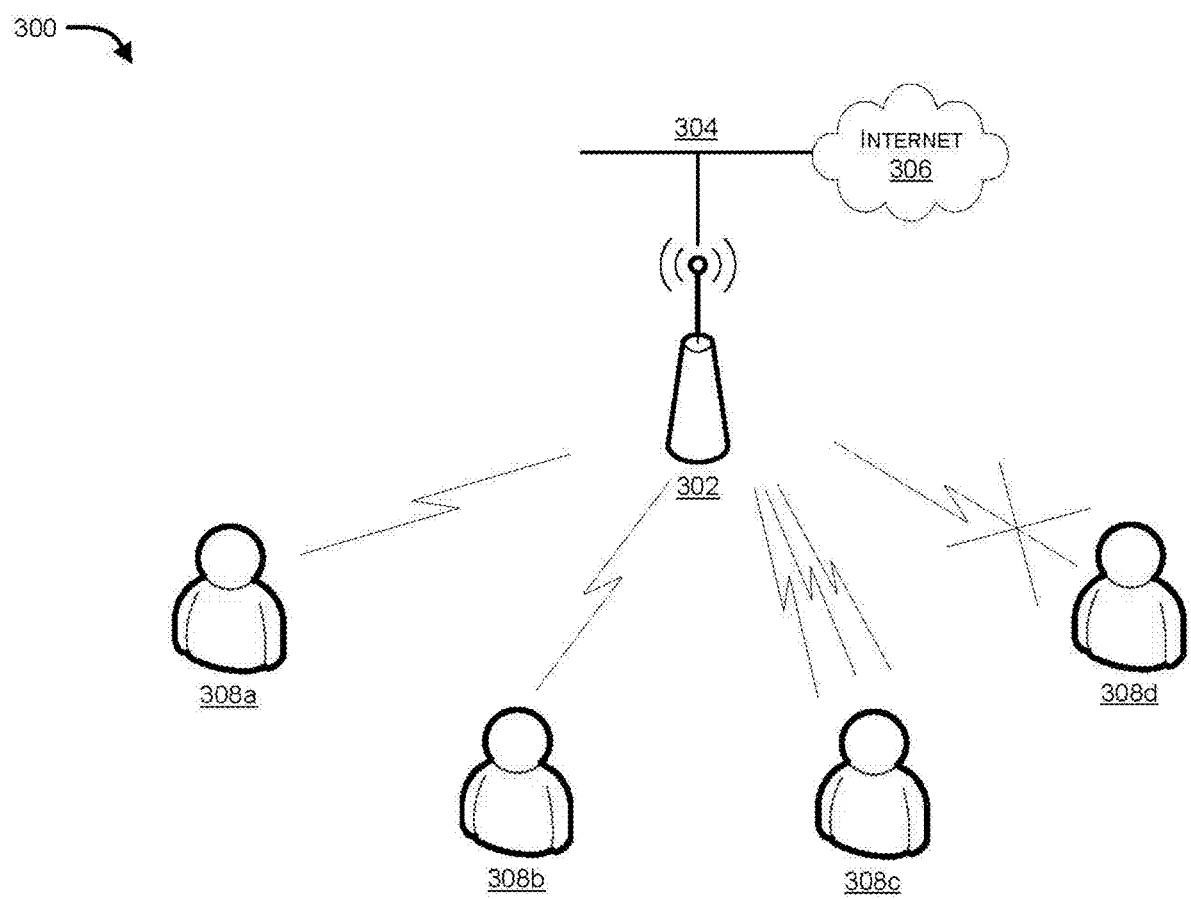
FIG. 3A illustrates an example flood attack that can be detected and mitigated in accordance with an embodiment of the present disclosure.

FIG. 3A illustrates an example flood attack 300 that can be detected and mitigated in accordance with an embodiment of the present disclosure. As shown in FIG. 3A, a wireless AP 302, which may be connected to backbone 304 of an enterprise network and further with Internet 306, may observe signals from different wireless devices 308*a-d* (one of which (e.g., wireless device 308*c*) may represent a malicious mobile station). In some embodiments, a MAC spoof attack or de-authentication attack may be identified based on observed probe signals received from a wireless device.

In the context of the present example, a malicious mobile station (e.g., wireless device 308*c*) is flooding the AP 302 with probe signals (e.g., auth frames with MAC spoofing). As a result, when a legitimate device 308*d* sends a probe signal or issues a request to the AP 302, the AP 302 may not have sufficient resources to serve the legitimate device 308*d* or the strength of the wireless transmission signal from the malicious mobile station may otherwise interfere with processing of such probe signal or request from the legitimate device 308*d*. As such, probe signals and/or requests issued by the legitimate device 308*d* by timeout or be rejected by AP 302.

According to one embodiment, the location of the malicious mobile station 308*c* responsible for the flooding attack can be determined, for example, by identifying a number of auth frames from the same MAC address exceeding a flooding threshold, and the wireless network security device (e.g., wireless network security device 106) can take action to mitigate the attack, for example, by (i) directing AP 302 to reject or drop further probe signals and/or requests from the malicious mobile station 308*c*; (ii) making use of location determination performed by or on behalf of the wireless network security device and smart beaming functionality implemented by the AP 302 as discussed further below with reference to FIG. 8; and/or (iii) making use of the location determination and causing the power of a wireless transmission signal of a nearby legitimate wireless AP (e.g., AP 302 or another AP (not shown)) to be increased.

Figure 3B:
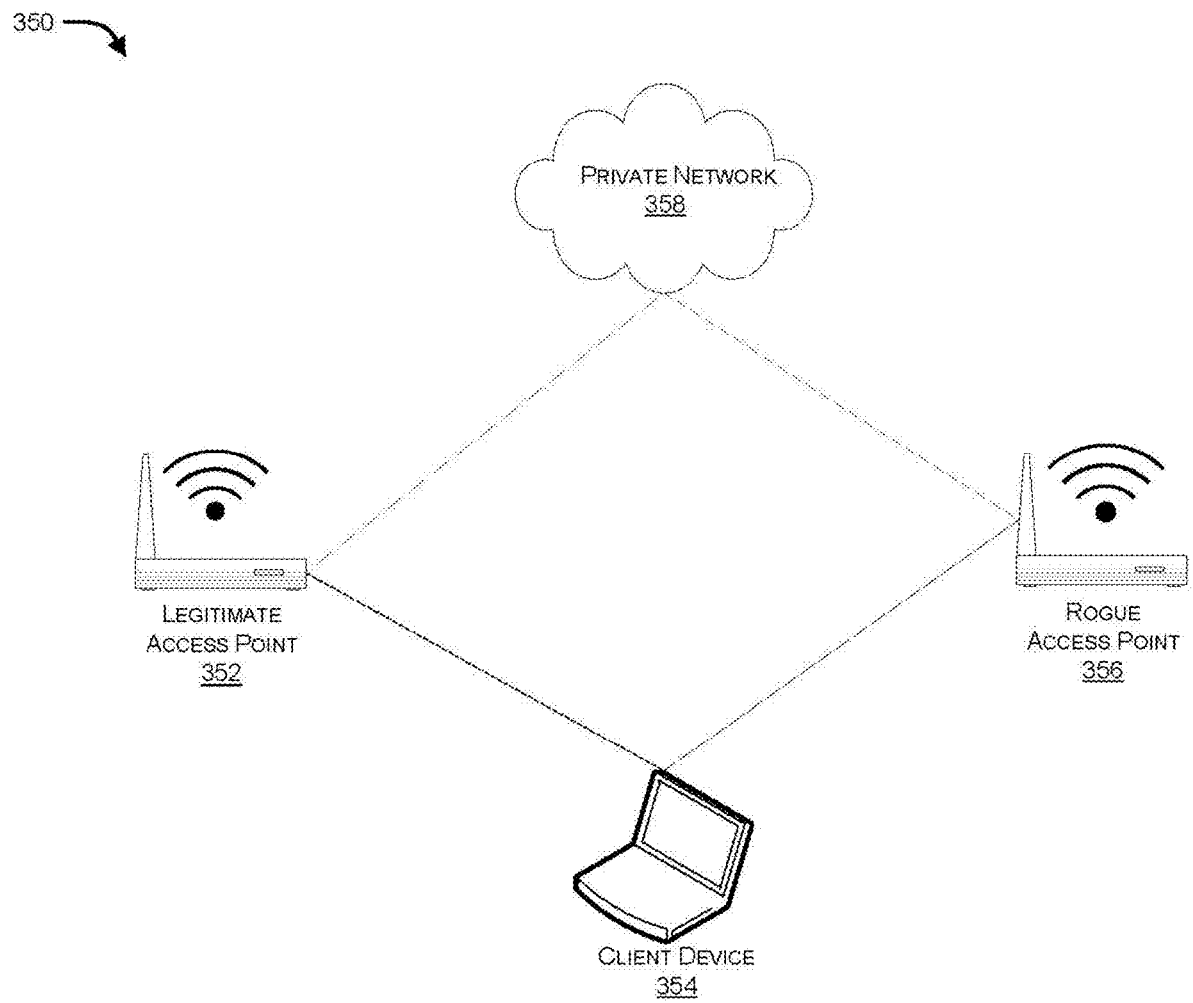
FIG. 3B illustrates an example evil twin attack that can be detected and mitigated in accordance with an embodiment of the present disclosure.

FIG. 3B illustrates an example evil twin attack 350 that can be detected and mitigated in accordance with an embodiment of the present disclosure. An evil twin is a rogue (unauthorized) AP that may attempt to appear legitimate, but is set up by a malicious actor to eavesdrop on wireless communications. In embodiments described herein, a wireless network security device (e.g., wireless network security device 106) can mark a wireless device as a rogue AP (e.g., an evil twin AP) when the physical address of the wireless device matches with a known physical addresses of a list of pre-authorized APs, but the determined location of the wireless device is not consistent with the historical location and/or the predicted location associated with the pre-authorized wireless devices. A typical evil twin attack involves an attacker conducts a de-authentication attack on a target client device, causing the the target client device to be disconnected from a legitimate AP (e.g., legitimate AP 352), thus causing the client device to automatically connect to the evil twin AP (e.g., rogue AP 356).

As shown in the FIG. 3B, even though the legitimate AP 352 may exist in the vicinity, wireless client device 354 may be caused to connect to the rogue AP 356 under various circumstances. For example, the rogue AP 356 may provide better signal strength and/or legitimate AP 352 may have been tricked into deauthenticating/disassociating wireless client device 354 based on a deauth frame sent from a malicious client device (not shown).

Evil twin APs may spoof the identity of an actual asset (e.g., the MAC address of legitimate AP 352), but with malicious intensions. For example, the rogue AP 356 may attempt to attract traffic, for example, that might otherwise be directed to the legitimate AP 352 via different kinds of wireless attacks. In an embodiment, the wireless network security device can identify the rogue AP based on historical movement patterns of the original MAC address (e.g., of the legitimate AP 352) and the MAC address of the evil twin AP (e.g., the rogue AP 356). For example, one or more real-time and/or historical locations of the rogue AP 356 can be looked up in a device location database to determine whether the location of the rogue point 356 matches known deployed locations of authorized APs (e.g., legitimate AP 352) associated with the wireless network (e.g., wireless network 100). In various embodiments, the details of each authorized AP making up the wireless network can be stored in the device location database and responsive to the wireless network security device detecting the presence of an AP at a differing location may result in the AP at issue being flagged as a rogue AP.

According to one embodiment, mitigation of the evil twin attack by the wireless network security device may include use of one or more of the various mitigation approaches for rogue APs as discussed above with reference to FIG. 3A and/or isolating the rogue AP, for example, using smart beaming to cause deauth frames to be sent in the particular direction of the detected rogue AP.

Figure 4:
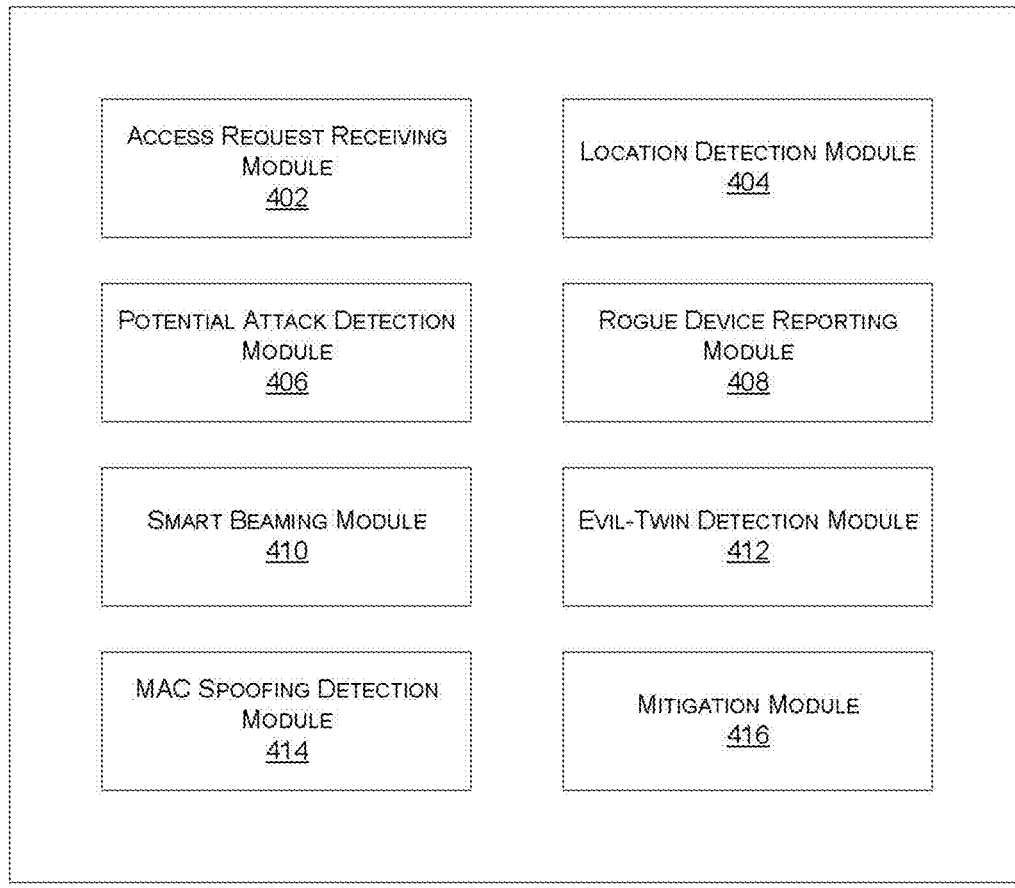
FIG. 4 illustrates functional modules of a wireless network security system in accordance with an embodiment of the present disclosure.

FIG. 4 illustrates functional modules of a wireless network security system 400 in accordance with an embodiment of the present disclosure. The wireless network security system 400 maintains a database containing location information (e.g., real-time and/or historical locations) and a media access control (MAC) address for wireless devices observed by APs of a wireless network (e.g., wireless network 100) of an enterprise. As described herein, information regarding one or more probe signals originating from a particular wireless device may be used to determines a location of the wireless device and in combination with other factors (e.g., historical and/or current location, probe signal counts and thresholds) may be used to identify a potential attack being conducted by the wireless device.

In the context of the present example, the wireless network security system 400 includes an access request receive module 402, a location detection module 404, a potential attack detection module 406, a rogue device reporting module 408, a smart beaming module 410, an evil twin detection module 412, a MAC spoofing detection module 414, and a mitigation module 416. The access request receiving module 402 may be responsible for receiving access requests (e.g., auth frames and association frames) from a wireless device to access a wireless network. The location detection module 404 may be responsible for determining a location of a wireless device, for example, using any or combination of RSSI-value based trilateration or other location detection methods using directional information, for example, received from the smart beamforming antennas. The potential attack detection module 406 is operable to detect a potential attack by a malicious wireless device in the wireless network and may make use of the MAC spoofing detection module 414 and/or the evil twin detection module for this purpose.

In an embodiment, the location detection module 404 receives information associated with one or more probe signals originated by a wireless device, for example, through one or more wireless APs. In an embodiment, the one or more probe signals include RSSI values indicative of the signal strength of the probe signal received from the wireless device with respect to different wireless APs. The location detection module 402 can than derive distance information from the RSSI values and a multilateral approach based on the distances to determine a location of the wireless device. The location determination process performed by the location detection module 402 may alternatively or additionally make use of directional information obtained from antennas of the wireless APs.

Based on the determined location of the wireless device, the potential attack detection module 406 may make use of the device location database to verify whether the determined location of the wireless device matches with the permissible locations or is within the permissible location boundaries. In one embodiment, the device location database stores one or more of real-time location information, historical location information and/or patterns of movement relating to observed wireless devices. The device location database may include permissible locations (e.g., locations of deployed authorized wireless APs) and location boundaries based on historical and predicted location of the authorized devices. In one embodiment, the potential attack detection module 406 can check whether the determined location of a wireless device is consistent with the permissible location or not. When the location of the wireless device does not match a permissible location, the wireless device can be flagged as a potential malicious mobile station or a potential rogue AP, as the case may be.

In an embodiment, the potential attack detection module 406 further makes use of the MAC address of the wireless device and behavior exhibited by the wireless device to identify a wireless device as a potential malicious wireless device.

In an embodiment, the potential attack detection module 406 can flag the wireless device as a legitimate wireless device (subject to further downstream analysis) in response to an affirmative determination that the determined location of the wireless device is within the authorized location boundaries, and physical address (e.g., the MAC address) of the wireless device matches with any of the stored physical addresses of the pre-authorized wireless devices. The potential attack detection module 406 can flag the wireless device as a rogue wireless device or potential attacker in response to non-affirmative determination when either the determined location of the wireless device is not within the authorized location boundaries, or the physical address of the wireless device does not match with any of the stored physical addresses of the pre-authorized wireless nodes.

The rogue device reporting module 408 may be responsible for reporting the identity and location of a flagged rogue wireless device, for example, to an administrator or to different security systems to allow them to take appropriate actions. The reporting module 408 may also send active notification or alerts, for example, to wireless devices, which may already be connected to the rogue wireless device. In an embodiment, the reporting module 408 can broadcast the identity and location of flagged rogue wireless device to all active devices connected in the wireless network to avoid any risk or exploitation of vulnerable nodes. The reporting module 408 may also report the nature of the potential attack. For example, the reporting module 408 may provide information regarding whether the wireless device flagged as potentially being malicious represents a rogue AP or a malicious mobile station (e.g., a compromised mobile client device).

The smart beaming module 410 may be used to configure the APs for smart beamforming in specific directions. For example, the smart beamforming antennas of the wireless APs can be configured to avoid transmission in the direction of the flagged wireless device. Depending upon the particular implementation, the wireless network security system can provide absolute or relative directional information to the APs (e.g., via a WLAN controller that manages the APs) to adjust the beamforming. In an embodiment, the smart beaming module 410 can causes the APs to narrow their focus, for example, on legitimate wireless devices, thus minimizing signal interference and increasing the strength of the signal for legitimate wireless devices. In an embodiment, system 400 can cause deauth frames to be sent in a particular direction based on a location of the potential attacker using the smart beaming module 410.

The evil twin detection module 412 may be responsible for detect existence of a particular type of rogue AP (e.g., an evil twin AP) in the wireless network. In an embodiment, the system 400 may flag an AP as an evil twin AP when the physical address of the AP matches with a list of authorized physical addresses, but the determined location of the AP is not consistent with an expected location of an authorized AP.

The MAC spoofing detection module 414 may be responsible for detecting MAC spoofing by a wireless device. In an embodiment, the wireless network security device may determine multiple wireless devices from which probe signals and/or requests are being received have the same MAC address but are operating in different locations. In an embodiment, system 400 may also monitor frequency of probe signals and/or requests received over a period of time to facilitate the identification of a MAC spoofing attack.

The mitigation module 416 is responsible for initiating mitigation measures to protect the wireless network from the potential attack. The mitigation measures may include causing the APs to block, drop, or reject probe signals and/or requests received from a potentially malicious mobile station, causing the APs, to send de-authentication/disassociation messages to a rogue AP and/or to wireless devices that may be connected to the rogue AP, and otherwise isolating the rogue AP as described herein. For example, in some embodiments, wireless network security system 400 can instruct legitimate APs associated with the wireless network to mount a de-authentication attack on the rogue AP.

The wireless network security system 400 may also predict potential attacks based on location information of wireless devices. For example, based on a current location of a malicious wireless device, the system 400, based on a knowledge base of commonly used physical paths on the floor plan or building based on the historical location data, the system 400 may predict the next possible movement of the malicious wireless device and can proactively initiate appropriate preventive actions in next predicted zone of the wireless network. The predictive threat detection and prevention may be helpful in connection with prioritizing the protection of highly secured zones first, for example, based on the location of the attacker and possible movement paths.

While a particular distribution of functionality is described in the context of the present example, those skilled in the art will appreciate there are numerous possible configurations and potential distributions of functionality. As such, there may be more or fewer modules in a particular implementation. Similarly, one or more modules of the system 400 may be implemented on the same virtual or physical device or dedicated virtual of physical devices can be assigned to perform functions of different modules. For example, the location detection module 402 can be implemented on a separate location detection server, which can receive information associated with probe signals from different APs or through a WLAN controller (e.g., WLAN controller 110) and determine a location of a wireless device.

Figure 5:
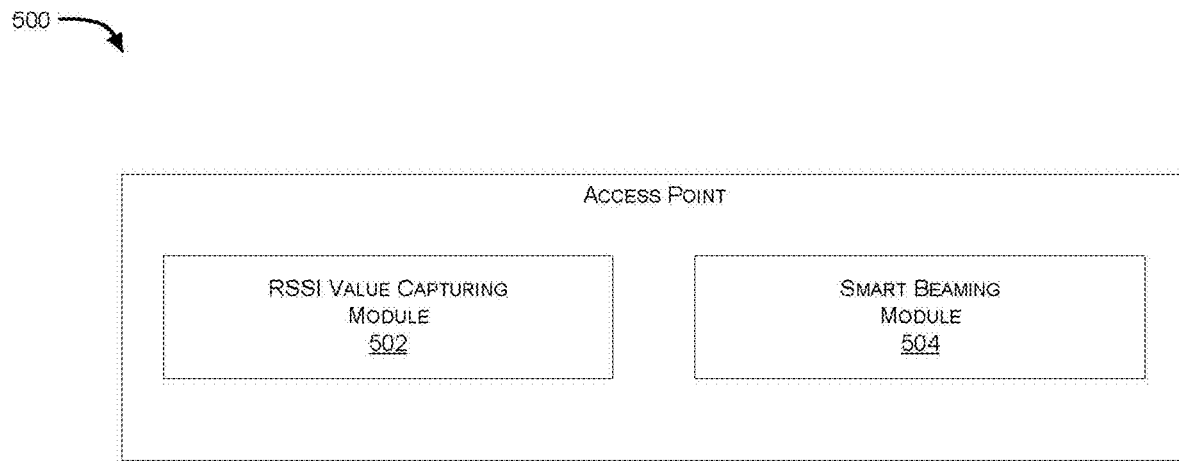
FIG. 5 illustrates functional modules implemented on a wireless access point in accordance with an embodiment of the present disclosure.

FIG. 5 illustrates functional modules implemented by an AP 500 in accordance with an embodiment of the present disclosure. In the context of the present example, the AP 500 includes an RSSI value capturing module 502 and a smart beaming module 504. The RSSI value capturing module 502 may be responsible for extracting RSSI values indicative of signal strength from probe signals and/or requests received by the AP 500 from wireless devices. The smart beaming module 504 may be responsible for directing one or more antennas of the AP 500 and/or retrieving directional information from the one or more antennas of the AP 500, for example, responsive to direction received from a WLAN controller (e.g., WLAN controller 110).

Figure 6:
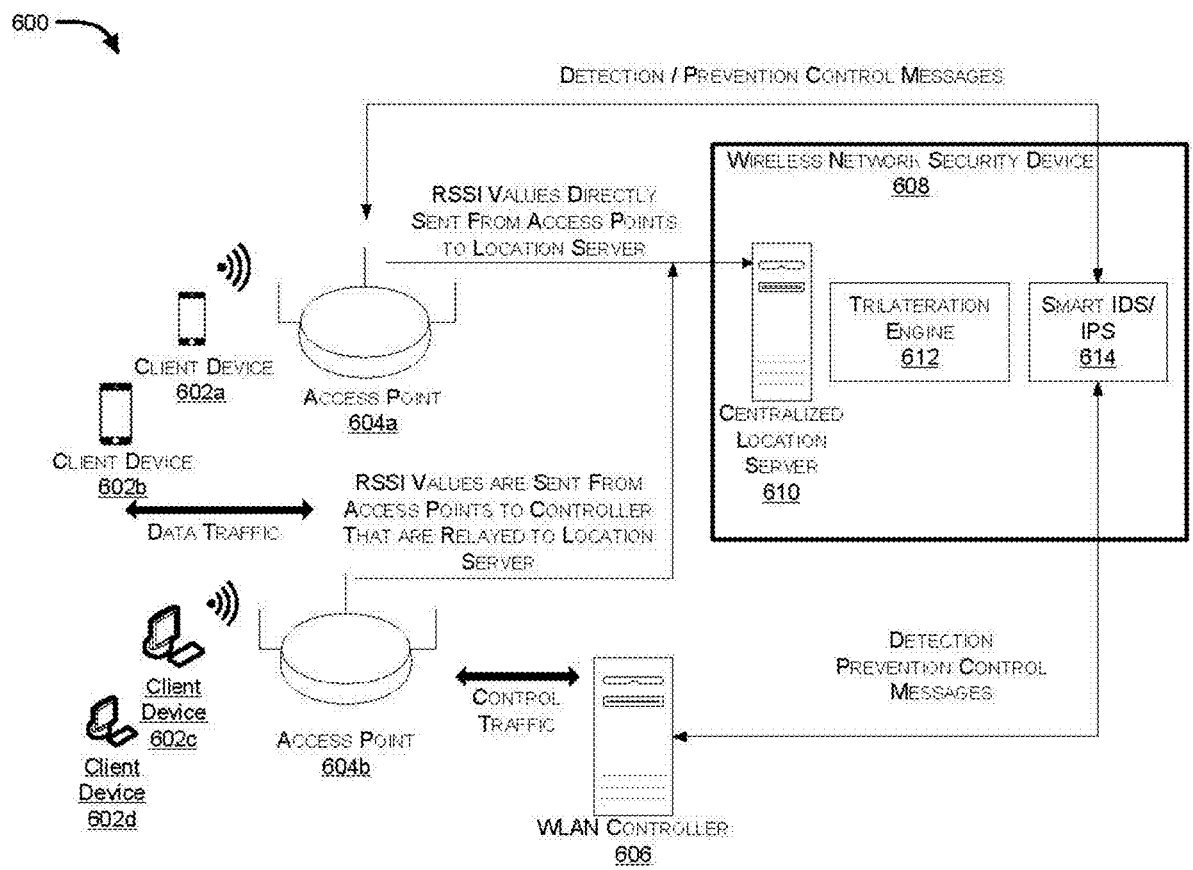
FIG. 6 illustrates the flow of information among various participants of a wireless network and a wireless network security system in accordance with an embodiment of the present disclosure.

FIG. 6 illustrates the flow of information among various participants of a wireless network and a wireless network security system in accordance with an embodiment of the present disclosure. As shown in the FIG. 6, client devices 602a-d (which may also be referred to as wireless devices 602a-d or mobile stations 602a-d), may be in proximity to a wireless network as represented by APs 604a-b. Responsive to receipt of a probe signal or a request from a client device 602 by one or more of APs 604a-b, the APs may extract RSSI values from the received probe signal or the received request. The APs 604a-b may further provide the RSSI values directly or indirectly via the WLAN controller 606 to a centralized location server 610 for use by a trilateration engine 612.

Responsive to identification of a potential malicious mobile station or a potential rogue AP, a smart IDS/IPS engine 614 associated with the wireless network security device 608 may cause the WLAN controller 606 and/or the APs 604a-b to take certain actions. For example, responsive to detection of potential attacker, the wireless network security device 608 can put in place one or more mitigation measures. In an embodiment, the smart IPS/IPS 614 can detection/prevention control messages to APs 604a-b directly or via the WLAN controller 606. For example, the detection/prevention control messages can cause a rogue AP to be isolated and/or cause APs 604a-b to drop, block, or reject probe signals and/or requests from a malicious mobile station.

In an embodiment, a location of wireless devices over a floor plan of the enterprise can be displayed to a network administrator. The floor plan overlaid with the known locations of deployed APs and with historical and/or real-time locations of observed wireless devices can be displayed using an interactive interface to allow the network administrator to visualize relative locations of the wireless devices.

Figure 7:
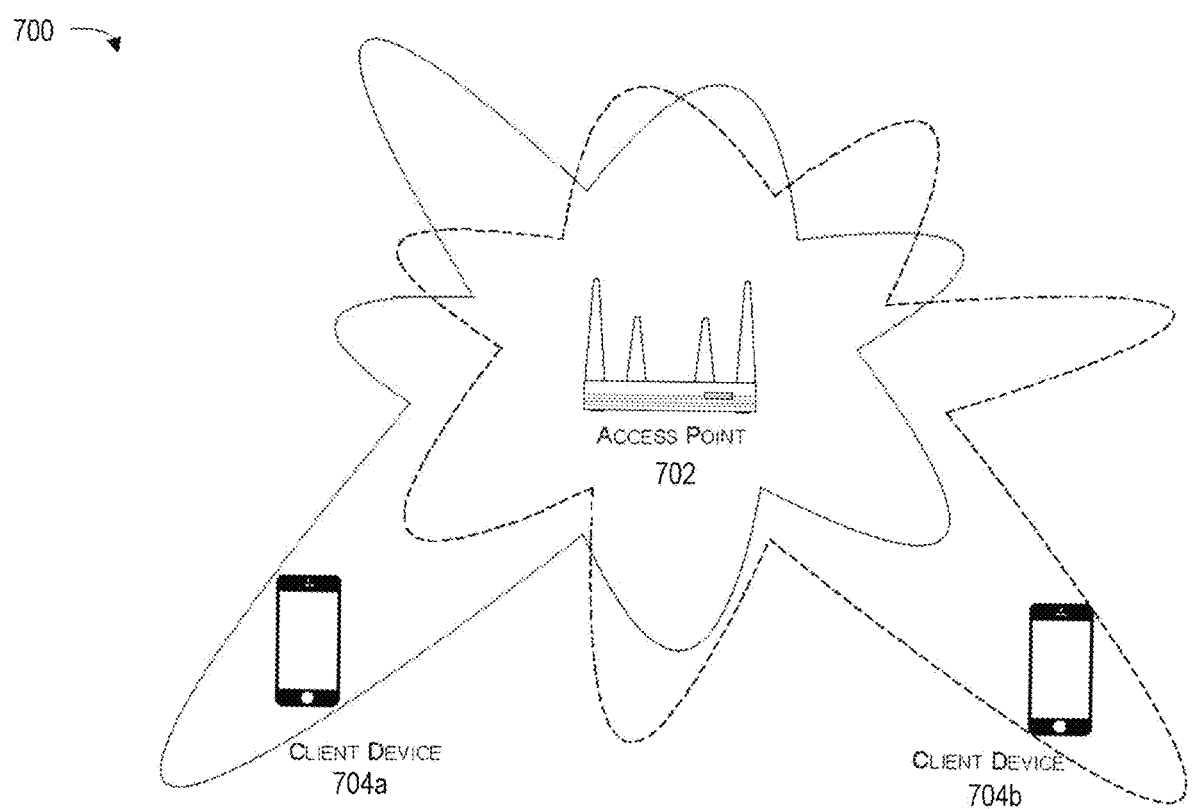
FIG. 7 conceptually illustrates beamforming by an access point in accordance with an embodiment of the present disclosure.

FIG. 7 conceptually illustrates beamforming 700 by an AP in accordance with an embodiment of the present disclosure. As shown in FIG. 7 an AP 702 having beamforming antennas can be configured to focus wireless transmission signals in a certain direction, for example, toward a legitimate (uncompromised) wireless device (e.g., client device 704a or client device 704b). In one embodiment, the beamforming functionality of AP 702, may be leveraged by a wireless network security device (e.g., wireless network security device 106) to mitigate a potential wireless attack. For example, responsive to detecting existence of a potential malicious mobile station, the wireless network security device may directly or indirectly via a WLAN controller (e.g., WLAN controller 110) managing the AP 702 cause the AP to focus its wireless transmission signals away from the potential malicious mobile station and in the direction of a legitimate (uncompromised) wireless device (e.g., client device 704a or client device 704b).

Figure 8:
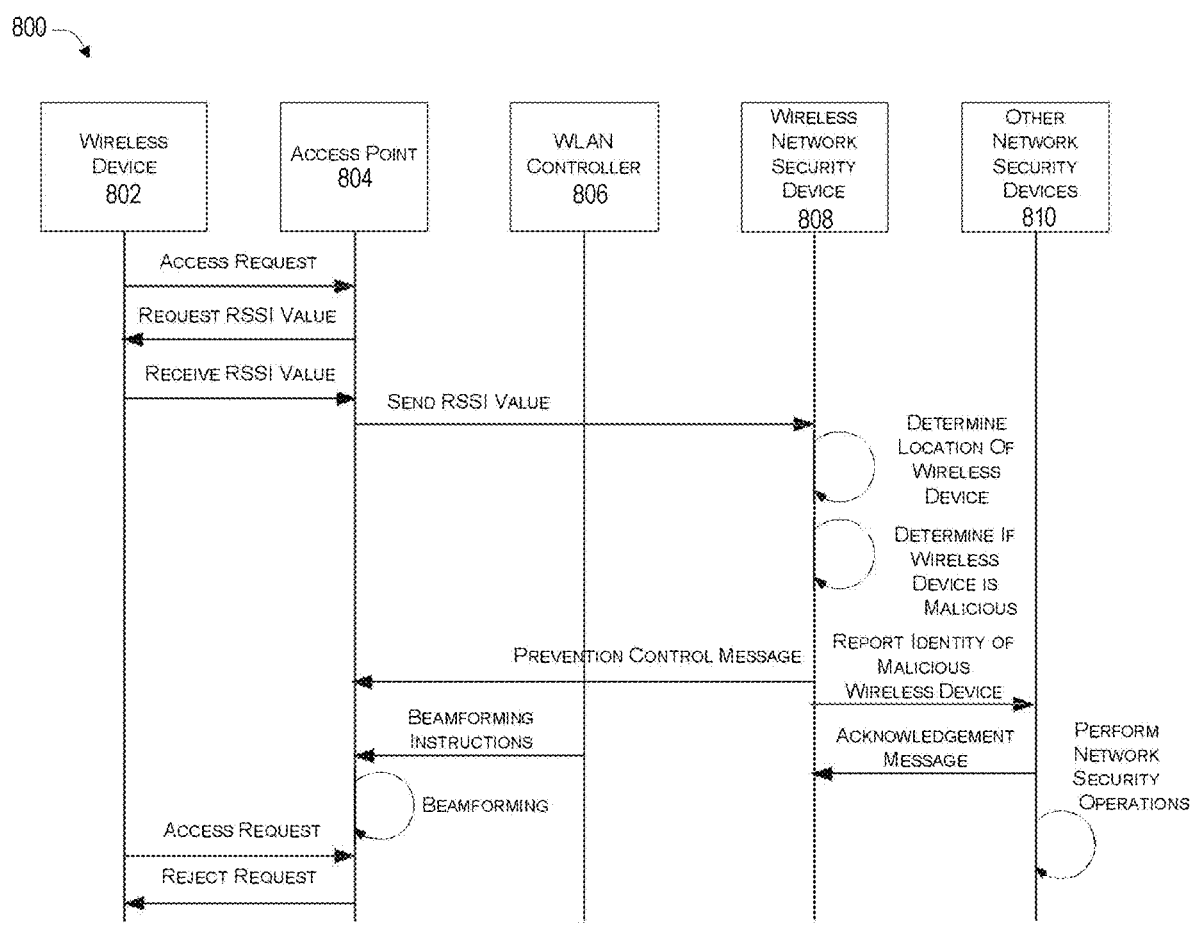
FIG. 8 is a message sequence diagram in accordance with an embodiment of the present disclosure.

FIG. 8 is a message sequence diagram in accordance with an embodiment of the present disclosure. As shown in FIG. 8, a wireless device 802 when attempting to connect with a wireless network may send one or more probe signals or an access request (e.g., an auth frame and/or an association frame) to AP 804. The AP 804 collects information associated with the probe signals originated from the wireless device 802. For example, the probe signals may include RSSI values, which may be extracted by the AP 804 and provided directly or indirectly via WLAN controller 806 to wireless network security device 808. In an embodiment, the wireless network security device 808 may use the RSSI values observed by multiple wireless APs including AP 804 to determine the location of the wireless device 802.

In the context of the present example, the wireless network security device 808 further determines whether the wireless device is malicious (e.g., a malicious mobile station or a rogue AP), for example, as described above. When the wireless device 802 is determined to be malicious, the wireless network security device 808 may perform mitigation appropriate for the type of wireless attack. For example, the wireless device may notify one or more other network security devices 810 (e.g., IDS and/or IPS appliances) to allow them to perform network security operations on traffic associated with the malicious wireless device and/or cause the AP 804 to be configured in a particular manner, for example, by sending a prevention control message directly to AP 804 or indirectly via WLAN controller 806. For example, assuming the prevention control message relates to focusing wireless transmission signals of the AP 804 in a certain direction, the WLAN controller may provide appropriate beamforming instructions to the AP 804. After implementing the beamforming instructions, the AP 804 may no longer see requests issued by the malicious mobile station 802 and to the extent is does may be directed by the WLAN controller to reject such requests.

Figure 9A:
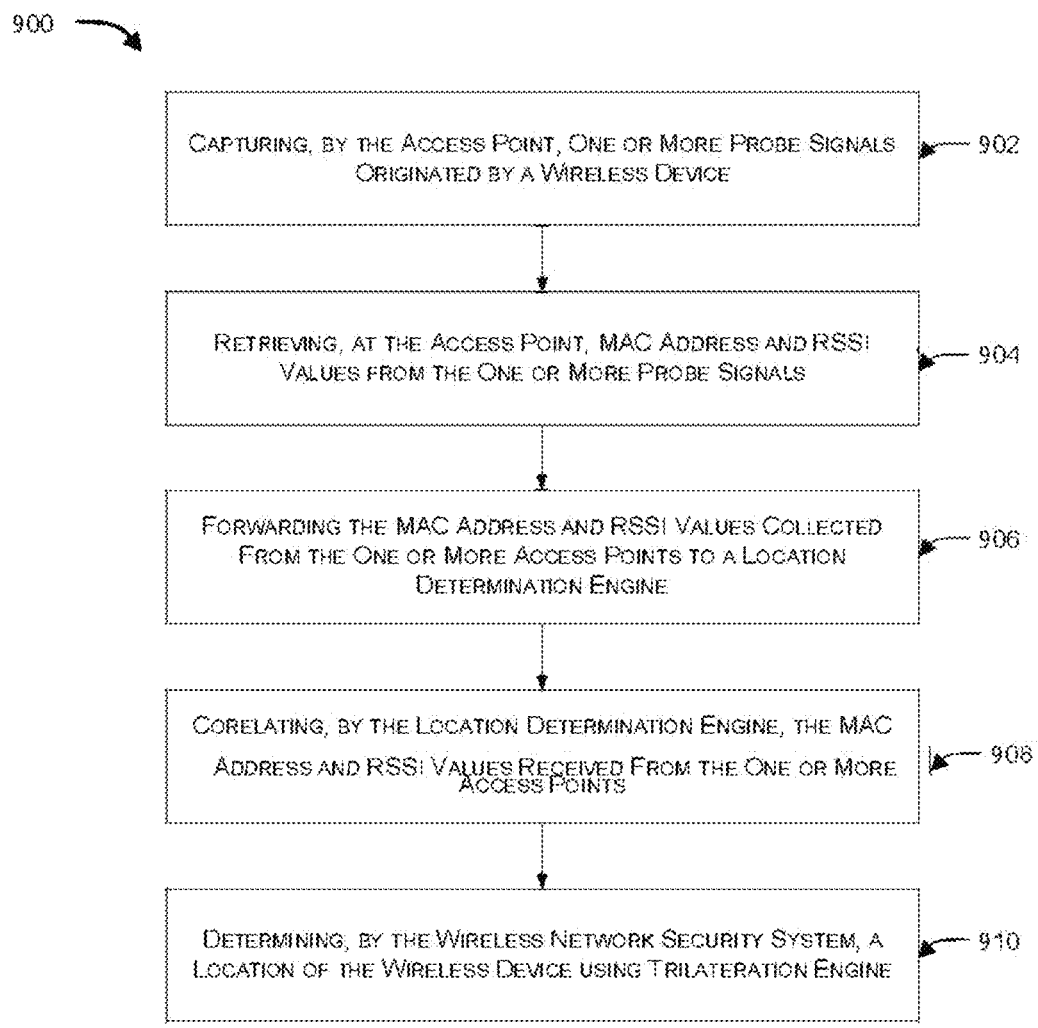
FIG. 9A is a flow diagram illustrating a location monitoring processing in accordance with an embodiment of the present disclosure.
Figure 9B:
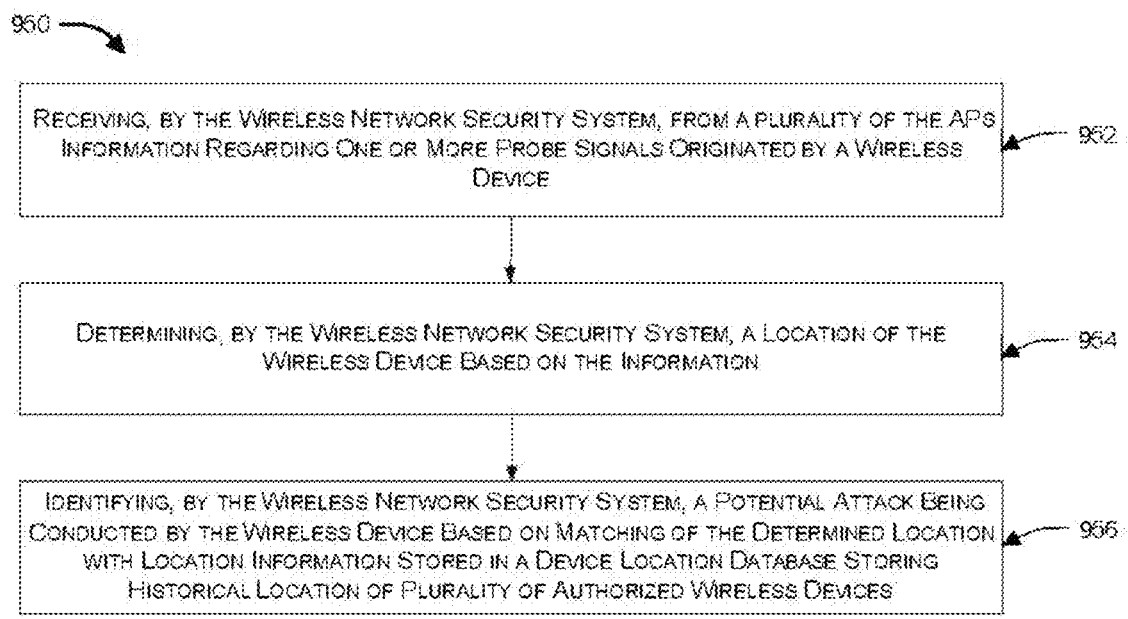
FIG. 9B is a flow diagram illustrating potential attack detection processing in accordance with an embodiment of the present disclosure.
Figure 10:
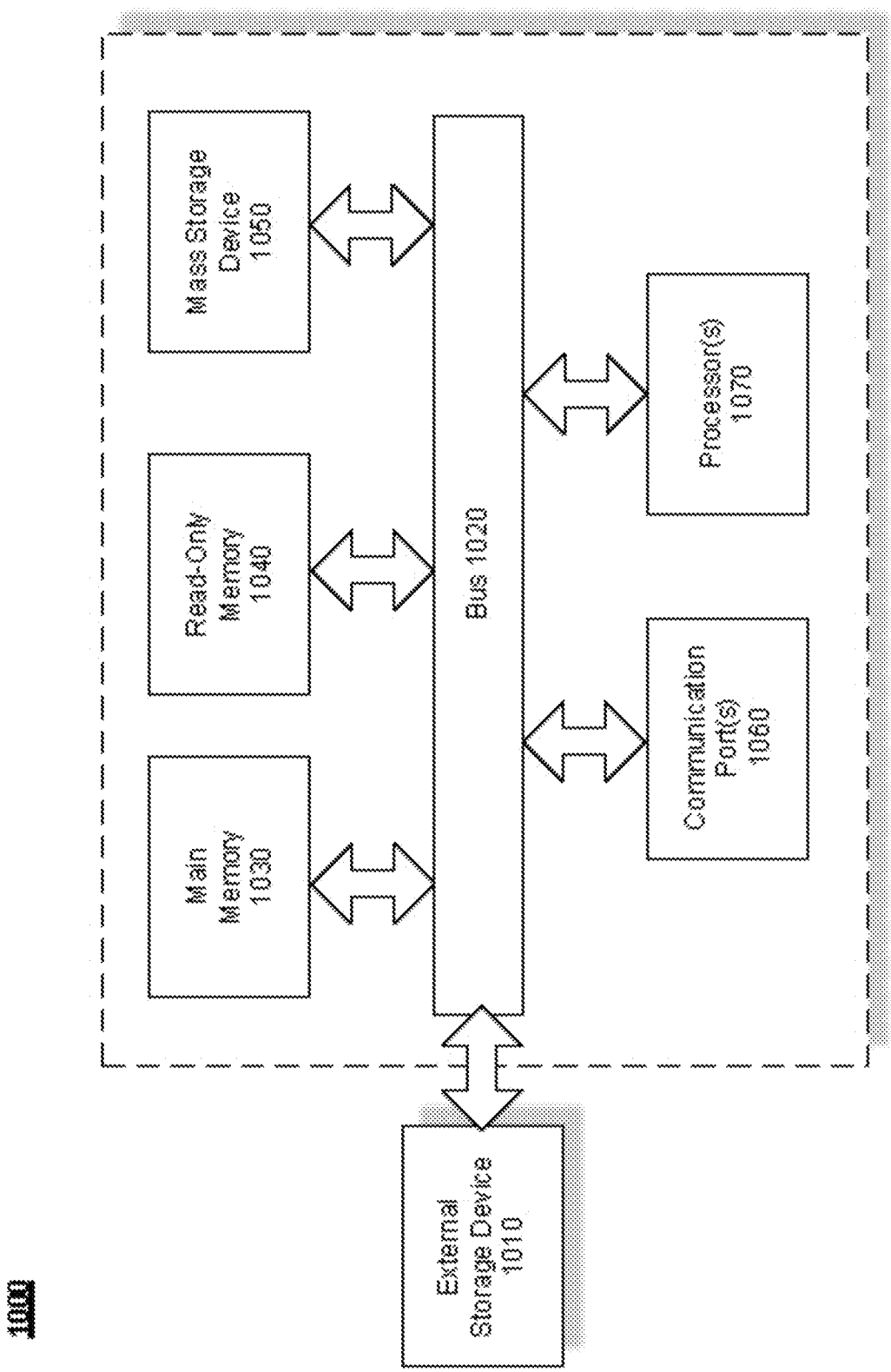
FIG. 10 illustrates an exemplary computer system in which or with which embodiments of the present invention may be utilized.

The various modules described above with reference to FIG. 4 and FIG. 5 and the processing herein with reference to the message sequence diagram of FIG. 8 and the flow diagrams of FIGS. 9A-B may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 10 below.

FIG. 9A is a flow diagram illustrating a location monitoring processing in accordance with an embodiment of the present disclosure. In an embodiment, the process of location monitoring includes capturing, by the AP, one or more probe signals originating from a wireless device as shown at step 902, retrieving, at the AP, MAC address and RSSI values from the one or more probe signals as shown at step 904, forwarding the MAC address and RSSI values collected from the one or more APs to a location determination engine as shown at step 906, corelating, by the location determination engine, the MAC address and RSSI values received from the one or more APs as shown at step 908 and determining, by the wireless network security system, a location of the wireless device using a trilateration engine as show at step 910. APs may send information associated with the observed probe signals to a location determination engine directly or through a WLAN Controller which relays the information to location determination engine. Location determination engine may be part of a wireless network security device or can be implemented on a stand-alone device or server.

FIG. 9B is a flow diagram illustrating potential attack detection processing in accordance with an embodiment of the present disclosure. As shown in FIG. 9B, the potential attack detection processing includes receiving, by the wireless network security system, from multiple APs information regarding one or more probe signals originated by a wireless device as shown at step 952, determining, by the wireless network security system, a location of the wireless device based on the information as shown at step 954, and identifying, by the wireless network security system, a potential attack being conducted by the wireless device based on various factors, for example, by matching of the determined location with location information stored in a device location database storing historical location of plurality of authorized wireless devices as shown at step 956.

FIG. 9 illustrates an exemplary computer system 900 in which or with which embodiments of the present invention may be utilized. Computer system 900 may represent all or some portion of an wireless network security device (e.g., wireless network security device 96, 400, 608, or 808), an AP (e.g., one of APs 102a-n, 204a-c or 605a-b or AP 302, 352, 500, 702, or 804), or a WLAN controller (e.g., WLAN controller 110, 606, or 806). As shown in FIG. 9, computer system includes an external storage device 910, a bus 920, a main memory 930, a read only memory 940, a mass storage device 950, a communication port 960, and a processing resource (e.g., processor(s) 970).

Those skilled in the art will appreciate that computer system 900 may include more than one processor 970 and communication ports 960. Examples of processor 1070 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1070 may include various modules associated with embodiments of the present invention.

Communication port 1060 can be any of an RS-232 port for use with a modem based dialup connection, a 10/100 Ethernet port, a Gigabit or 10 Gigabit port using copper or fiber, a serial port, a parallel port, or other existing or future ports. Communication port 1060 may be chosen depending on a network, such a Local Area Network (LAN), Wide Area Network (WAN), or any network to which computer system connects.

Memory 1030 can be Random Access Memory (RAM), or any other dynamic storage device commonly known in the art. Read only memory 1040 can be any static storage device(s) e.g., but not limited to, a Programmable Read Only Memory (PROM) chips for storing static information e.g. start-up or BIOS instructions for processor 1070.

Mass storage 1050 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1020 communicatively couples processor(s) 1070 with the other memory, storage and communication blocks. Bus 1020 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1070 to software system.

Optionally, operator and administrative interfaces, e.g. a display, keyboard, and a cursor control device, may also be coupled to bus 1020 to support direct operator interaction with computer system. Other operator and administrative interfaces can be provided through network connections connected through communication port 1060. External storage device 1010 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
   maintaining, by a wireless network security system, a database containing historical location information and a media access control (MAC) address for a plurality of wireless devices observed by wireless access points (APs) of a wireless network of an enterprise;
   receiving, by the wireless network security system, from a plurality of the APs information regarding one or more probe signals originated by a wireless device of the plurality of wireless devices;
   determining, by the wireless network security system, a location of the wireless device based on the information;
   identifying a potential attack being conducted by the wireless device or in which the wireless device is involved based on one or more of behavior exhibited by the wireless device, the location and the database; and
   responsive to said identifying, causing, by the wireless network security system, a mitigation to be performed based on the potential attack, wherein the mitigation comprises:
      blocking, dropping or rejecting, by the APs, subsequent probe signals received from the wireless device;
      sending, by the APs, deauthentication/disassociation messages to the wireless device; or reducing, by the APs, signal interference by the wireless device by performing beamforming.

2. The method of claim 1, wherein the information includes at least three Received Signal Strength Indicator (RSSI) values associated with the one or more probe signals and wherein said determining, by the wireless network security system, a location of the wireless device based on the information comprises performing trilateration based on the at least three RSSI values.

3. The method of claim 1, wherein the potential attack comprises a MAC spoof attack and wherein said identifying is further based on observed authentication/association requests received from the wireless device.

4. The method of claim 1, wherein the behavior exhibited by the wireless device includes transmission of one or more deauthentication/disassociation requests, wherein the potential attack comprises a deauthication attack and wherein said identifying is further based on the one or more deauthentication/disassociation requests.

5. The method of claim 1, wherein the potential attack comprises an attempt to connect to the wireless network from outside physical boundaries of the enterprise.

6. The method of claim 1, wherein the potential attack comprises a rogue AP.

7. A system comprising:
a processing resource; and
a non-transitory computer-readable medium, coupled to the processing resource, having stored therein instructions that when executed by the processing resource cause the processing resource to perform a method comprising:
maintaining a database containing historical location information and a media access control (MAC) address for a plurality of wireless devices observed by wireless access points (APs) of a wireless network of an enterprise;
receiving from a plurality of the APs information regarding one or more probe signals originated by a wireless device of the plurality of wireless devices;
determining a location of the wireless device based on the information; and
identifying a potential attack being conducted by the wireless device or in which the wireless device is involved based on one or more of behavior exhibited by the wireless device, the location and the database; wherein the potential attack comprises a MAC spoof attack and wherein said identifying is further based on observed authentication/association requests received from the wireless device.

8. The system of claim 7, wherein the information includes at least three Received Signal Strength Indicator (RSSI) values associated with the one or more probe signals and wherein said determining a location of the wireless device based on the information comprises performing trilateration based on the at least three RSSI values.

9. The system of claim 7, wherein the behavior exhibited by the wireless device includes transmission of one or more deauthentication/disassociation requests, wherein the potential attack comprises a deauthication attack and wherein said identifying is further based on the one or more deauthentication/disassociation requests.

10. The system of claim 7, wherein the potential attack comprises an attempt to connect to the wireless network from outside physical boundaries of the enterprise.

11. The system of claim 7, wherein the potential attack comprises a rouge AP.

12. The system of claim 7, wherein the method further comprises responsive to said identifying, causing a mitigation to be performed based on the potential attack.

13. The system of claim 12, wherein the mitigation comprises blocking, dropping or rejecting, by the APs, subsequent probe signals received from the wireless device.

14. The system of claim 12, wherein the mitigation comprises sending, by the APs, deauthentication/disassociation messages to the wireless device.

15. The system of claim 12, wherein the mitigation comprises reducing, by the APs, signal interference by the wireless device by performing beamforming.

16. A non-transitory machine readable medium storing instructions that when executed by a processing resource of a computer system cause the processing resource to perform a method comprising:
maintaining a database containing historical location information and a media access control (MAC) address for a plurality of wireless devices observed by wireless access points (APs) of a wireless network of an enterprise;
receiving from a plurality of the APs information regarding one or more probe signals originated by a wireless device of the plurality of wireless devices;
determining a location of the wireless device based on the information;
identifying a potential attack being conducted by the wireless device or in which the wireless device is involved based on one or more of behavior exhibited by the wireless device, the location and the database; and
responsive to said identifying, causing, by the wireless network security system, a mitigation to be performed based on the potential attack, wherein the mitigation comprises:
blocking, dropping or rejecting, by the APs, subsequent probe signals received from the wireless device;
sending, by the APs, deauthentication/disassociation messages to the wireless device; or
reducing, by the APs, signal interference by the wireless device by performing beamforming.

17. The non-transitory machine readable medium of claim 16, wherein the information includes at least three Received Signal Strength Indicator (RSSI) values associated with the one or more probe signals and wherein said determining a location of the wireless device based on the information comprises performing trilateration based on the at least three RSSI values.

18. The non-transitory machine readable medium of claim 16, wherein the potential attack comprises a MAC spoof attack and wherein said identifying is further based on observed authentication/association requests received from the wireless device.

19. The non-transitory machine readable medium of claim 16, wherein the behavior exhibited by the wireless device includes transmission of one or more deauthentication/disassociation requests, wherein the potential attack comprises a deauthication attack and wherein said identifying is further based on the one or more deauthentication/disassociation requests.

20. The non-transitory machine readable medium of claim 16, wherein the potential attack comprises an attempt to connect to the wireless network from outside physical boundaries of the enterprise.

* * * * *